United States Patent
Tang et al.

(10) Patent No.: US 12,169,151 B1
(45) Date of Patent: Dec. 17, 2024

(54) DETERMINING TIGHTENING CLASS OF A TIGHTENING OPERATION PERFORMED BY A TIGHTENING TOOL

(71) Applicant: ATLAS COPCO INDUSTRIAL TECHNIQUE AB, Stockholm (SE)

(72) Inventors: Lifei Tang, Nacka (SE); Toni Axelsson, Gustavsberg (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/718,135

(22) PCT Filed: Nov. 9, 2022

(86) PCT No.: PCT/EP2022/081316
§ 371 (c)(1),
(2) Date: Jun. 10, 2024

(87) PCT Pub. No.: WO2023/110231
PCT Pub. Date: Jun. 22, 2023

(30) Foreign Application Priority Data

Dec. 17, 2021 (SE) .................... 2130370-6

(51) Int. Cl.
*G01L 5/24* (2006.01)
*B25B 23/145* (2006.01)

(52) U.S. Cl.
CPC ............ *G01L 5/24* (2013.01); *B25B 23/1456* (2013.01)

(58) Field of Classification Search
CPC .............................. B25B 23/1456; G01L 5/24
See application file for complete search history.

(56) References Cited

U.S. PATENT DOCUMENTS

| 2019/0227528 A1 | 7/2019 | Abbott et al. |
| 2020/0009696 A1 | 1/2020 | Matsuoka et al. |
| 2024/0044735 A1* | 2/2024 | Cantadori ................. G01L 5/24 |

FOREIGN PATENT DOCUMENTS

| CN | 107576435 A | 1/2018 |
| EP | 1398119 A1 | 3/2004 |

(Continued)

OTHER PUBLICATIONS

Atlas Copco Industrial Technique AB, International Patent Application No. PCT/EP2022/081316, International Search Report, Jan. 31, 2023.

(Continued)

*Primary Examiner* — Eric S. McCall
(74) *Attorney, Agent, or Firm* — Moore & Van Allen PLLC; W. Kevin Ransom

(57) ABSTRACT

A method for determining a tightening class of a tightening operation performed by a tightening tool is provided. The method comprises acquiring time-domain representations of sets of observed torque and angle values for fasteners having been tightened by the tightening tool, acquiring frequency-domain representations of the observed sets of torque values, associating a tightening class with each acquired time-domain and frequency-domain representation identifying a tightening operation, training a machine-learning model with the acquired time-domain representations and frequency-domain representations and the tightening class and supplying the trained machine-learning model with a further acquired time-domain representation frequency-domain representation for a fastener having been tightened by the tightening tool, wherein the trained machine-learning model outputs an estimated tightening class for the supplied set of observed torque and angle values.

14 Claims, 7 Drawing Sheets

(56) References Cited

FOREIGN PATENT DOCUMENTS

EP 3623108 A1 3/2020
JP 2959310 B2 10/1999
WO 2021155156 A1 8/2021

OTHER PUBLICATIONS

Atlas Copco Industrial Technique AB, International Patent Application No. PCT/EP2022/081316, Written Opinion, Jan. 31, 2023.
Atlas Copco Industrial Technique AB, International Patent Application No. PCT/EP2022/081316, International Preliminary Report on Patentability, Feb. 29, 2024.
Atlas Copco Industrial Technique AB, Swedish Patent Application No. 2130370-6, Office Action, Sep. 6, 2022.

\* cited by examiner

US 12,169,151 B1

DETERMINING TIGHTENING CLASS OF A TIGHTENING OPERATION PERFORMED BY A TIGHTENING TOOL

CROSS-REFERENCE TO RELATED APPLICATIONS

This application is a National Stage Patent Application (filed under 35 § U.S.C. 371) of PCT/EP2022/081316 filed Nov. 9, 2022 of the same title, which, in turn claims priority to Swedish Patent Application No. 2130370-6 filed Dec. 17, 2021 of the same title; the contents of each of which are hereby incorporated by reference.

TECHNICAL FIELD

The present disclosure relates to a method for determining a tightening class of a tightening operation performed by a tightening tool, and a control device performing the method.

BACKGROUND

During tightening of a fastener such as a bolt or a screw using a tightening tool, there are several undesired tightening results that may occur for the bolt or screw being tightened.

Analysing sensor data from the tightening tool provides valuable insight as regards the tightening result. Analytical models may be developed to determine the tightening result based on sensor data from the tightening tool.

However, whether or not a tightening result is correct may be difficult to determine by a human operator or a machine, and is further burdensome and time consuming.

SUMMARY

One objective is to solve, or at least mitigate, this problem in the art and thus to provide an improved method of determining tightening results of a tightening tool.

This objective is attained in a first aspect by a method for determining a tightening class of a tightening operation performed by a tightening tool. The method comprises acquiring time-domain representations of sets of observed torque and angle values for fasteners having been tightened by the tightening tool, acquiring frequency-domain representations of the observed sets of torque values for the fasteners having been tightened by the tightening tool, associating a tightening class with each acquired time-domain representation of the sets of observed torque and angle values and each acquired frequency-domain representation of the sets of observed torque values, the tightening class identifying a type of tightening operation having been applied to the fasteners, training a machine-learning model with the acquired time-domain representations of the sets of observed torque and angle values, the acquired frequency-domain representations of the sets of observed torque values and the tightening class associated with each set and supplying the trained machine-learning model with a further acquired time-domain representation of a set of observed torque and angle values and a frequency-domain representation of the further set of observed torque values for a fastener having been tightened by the tightening tool, wherein the trained machine-learning model outputs an estimated tightening class for the supplied set of observed torque and angle values.

This objective is attained in a second aspect by a control device configured to determine a tightening class of a tightening operation performed by a tightening tool, the control device comprising a processing unit and a memory, said memory containing instructions executable by said processing unit, whereby the control device is operative to acquire time-domain representations of sets of observed torque and angle values for fasteners having been tightened by the tightening tool, acquire frequency-domain representations of the observed sets of torque values for the fasteners having been tightened by the tightening tool, associate a tightening class with each acquired time-domain representation of the sets of observed torque and angle values and each acquired frequency-domain representation of the sets of observed torque values, the tightening class identifying a type of tightening operation having been applied to the fasteners, train a machine-learning model with the acquired time-domain representations of the sets of observed torque and angle values, the acquired frequency-domain representations of the sets of observed torque values and the tightening class associated with each set and supply the trained machine-learning model with a further acquired time-domain representation of a set of observed torque and angle values and a frequency-domain representation of the further set of observed torque values for a fastener having been tightened by the tightening tool, wherein the trained machine-learning model outputs an estimated tightening class for the supplied set of observed torque and angle values.

Hence, in addition to acquiring time-domain representations of torque and angle values for fasteners having been tightened by the tightening tool for training a machine-learning model, frequency-domain representations of the torque values are acquired. Advantageously, the frequency domain representations of the torque values facilitates observation of characteristics of the torque data which typically is not visible in the corresponding time-domain representation.

In an embodiment, the acquiring of frequency-domain representations of the observed sets of torque values for the fasteners having been tightened by the tightening tool further comprises acquiring frequency-domain representations of the observed sets of angle values for the fasteners having been tightened; and the associating further comprises associating the tightening class with each acquired frequency-domain representation of the sets of observed angle values; the training of the machine-learning model further comprising training the machine-learning model with the acquired frequency-domain representations of the sets of observed angle values; and wherein the supplying further comprises supplying the trained machine-learning model with a further acquired frequency-domain representation of the further set of observed angle values for a fastener having been tightened by the tightening tool.

In an embodiment, the frequency-domain representations of the observed torque values and the observed angle values is acquired by performing a fast Fourier transform (FFT) on the acquired time-domain representations of the observed torque values and the observed angle values.

In an embodiment, the machine learning is based on one or more of neural networks, random forest-based classification and regression analysis.

In an embodiment, an alert of the estimated tightening class is provided, e.g. to an operator of the tightening tool, to the tightening tool itself, to a supervision control room or to a remote cloud function, etc.

In an embodiment, the tightening tool provides an audible and/or visual alert to the operator of the tool.

In an embodiment, the tightening class is selected among a group of tightening operations having been applied to the fasteners indicating disengage, socket slip, stick slip, thread lock and high rundown torque. Other types may be envisaged.

In a third aspect, a computer program comprising computer-executable instructions is provided for causing the tightening tool to perform steps of the method of the first aspect when the computer-executable instructions are executed on a processing unit included in the tightening tool.

In a fourth aspect, a computer program product is provided comprising a computer readable medium, the computer readable medium having the computer program of the third aspect embodied thereon.

As is understood, the control device may be operative to perform the method according to any one of the above described embodiments. Further in an aspect, a tightening tool is provided comprising the control device.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
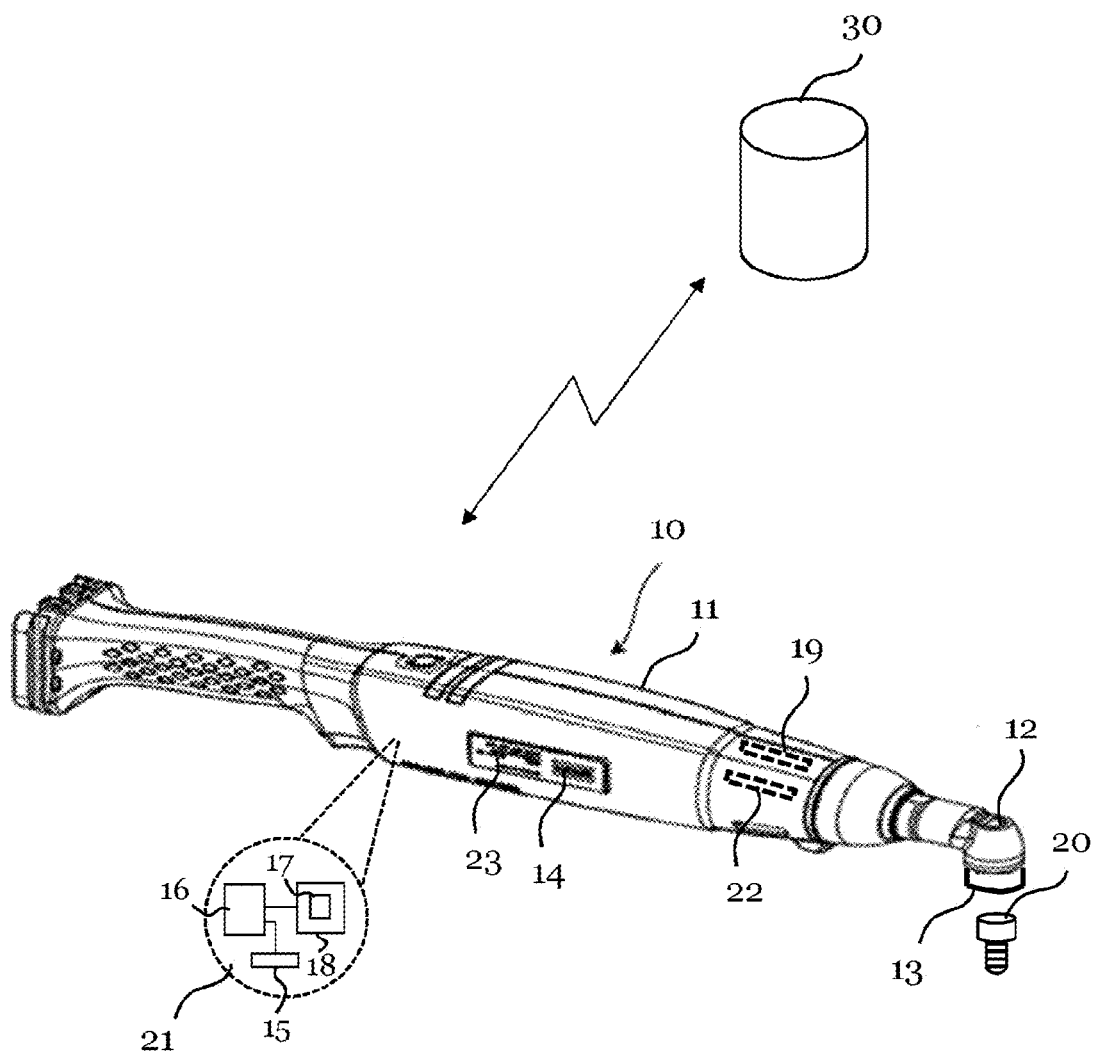
FIG. 1 illustrates a tightening tool configured to apply a torque to a fastener, in which tool embodiments may be implemented.

FIG. 1 illustrates a tool in the form of a tightening tool 10 configured to apply a torque to a fastener such as a bolt 20, in which tool embodiments may be implemented.

The tightening tool 10 may be cordless or electrically powered via a cord and has a main body 11 and a tool head 12. The tool head 12 has an output shaft with a socket 13 configured to be rotatably driven by an electric motor arranged inside the main body 11 to apply the torque to the bolt 20.

The tightening tool 10 may be arranged with a display 14 via which an operator of the tool 10 may be presented with information relating to operation of the tool 10, and an interface 23 via which the operator may input data to the tool 10.

The tightening tool 10 may further be arranged with communicating capability in the form of a radio transmitter 15 for wirelessly transmitting operational data, such as applied torque, to a remotely located device such as a cloud server 30.

The steps of the method to be described in the following as performed by the tool 10 are in practice performed by a control device 21 comprising a processing unit 16 embodied in the form of one or more microprocessors arranged to execute a computer program 17 downloaded to a storage medium 18 associated with the microprocessor, such as a Random Access Memory (RAM), a Flash memory or a hard disk drive. The processing unit 16 is arranged to cause the tool 10 to carry out the method according to embodiments when the appropriate computer program 17 comprising computer-executable instructions is downloaded to the storage medium 18 and executed by the processing unit 16. The storage medium 18 may also be a computer program product comprising the computer program 17. Alternatively, the computer program 17 may be transferred to the storage medium 18 by means of a suitable computer program product, such as a Digital Versatile Disc (DVD) or a memory stick. As a further alternative, the computer program 17 may be downloaded to the storage medium 18 over a network. The processing unit 16 may alternatively be embodied in the form of a digital signal processor (DSP), an application specific integrated circuit (ASIC), a field-programmable gate array (FPGA), a complex programmable logic device (CPLD), etc.

As is understood, the control device 21 may be arranged inside the tightening tool 10 or in connection to the tool 10, for instance as a control device 21 attached to an external side of the main body 11 of the tool 10.

Further, the tool 10 comprises a first in-built sensor 19 capable of measuring the torque applied to the bolt 20 and a second in-built sensor 22 capable of measuring a rotation angle of a drive shaft of the tightening tool 10. The torque sensor 19 and the angle sensor 22 are in communication with the processing unit 16 such that the processing unit 16 may acquire the measured torque and angle values. Alternatively, the tightening tool 10 may comprise merely an angle sensor (and no torque sensor), wherein the torque value may be calculated based on the sensed rotation angle value.

Now upon an operator using the tightening tool 10 to tighten a fastener such as the bolt 20, it is important that the tightening operation is performed correctly for the tightened bolt to maintain its fastening durability. If not, there is a risk that the tightening becomes inferior which in worst case may cause the bolt 20 to unscrew. Thus, it is crucial that the bolt 20 is correctly tightened and if not, it is desirable to attain an indication accordingly such that the operator may utilize the tool 10 to correctly retighten the bolt 20.

One such tightening operation performed by the tool 10 (and its human operator) is referred to as disengagement.

During disengagement, the torque values suddenly drop to zero before completion of the tightening program being performed.

If for instance the torque values suddenly drop to zero before completion of the tightening, disengagement between the output shaft and socket 13 and the bolt 20 may have occurred. This may be caused by operator behaviour, worn out tool parts and/or fasteners, incorrect tool programming, etc.

FIGS. 2*a*-*d* illustrate a plurality of undesired tightening operations being performed by the tool 10. The combination of the torque and angle values for a tightening program being performed is sometimes referred to as a trace.

Figure 2A:
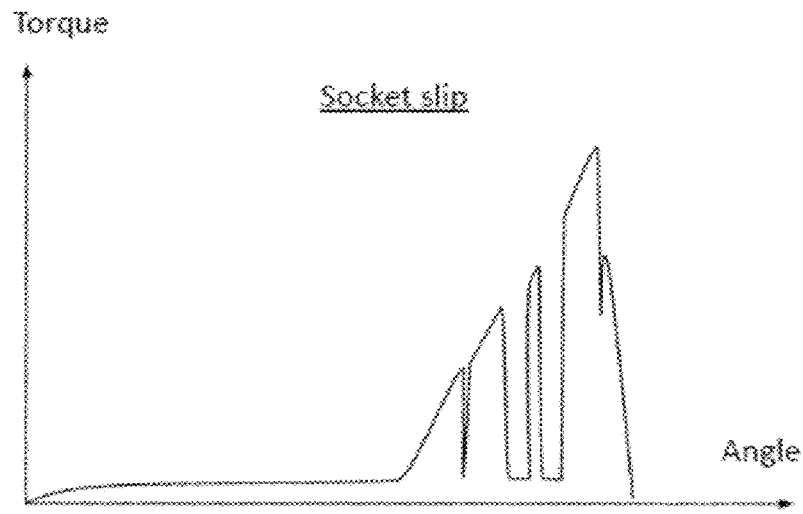
FIGS. 2a-d illustrates different types of undesired tightening operations which may be performed by the tool during a tightening program.

FIG. 2*a* illustrates a particular type of tightening operation commonly referred to as socket slip, which may occur when the torque value increases and decreases at periodical angle intervals.

Figure 2B:
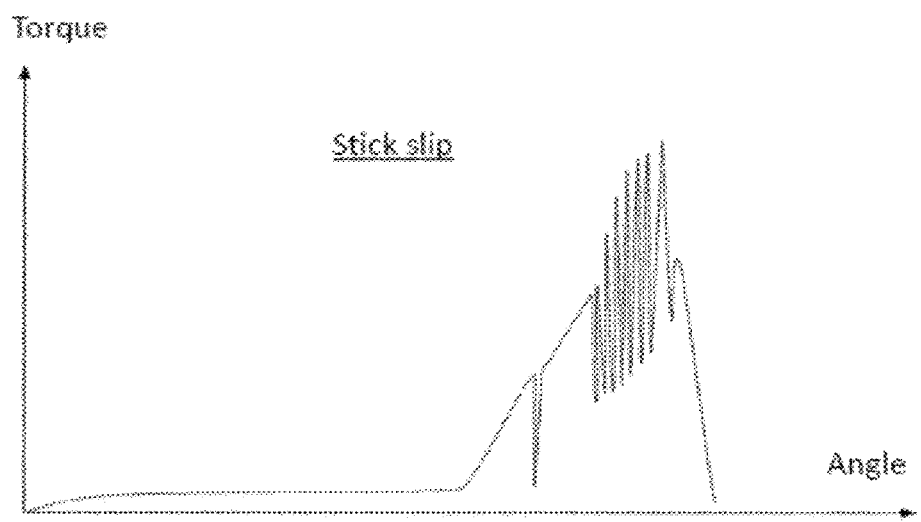

FIG. 2*b* illustrates another particular type of tightening operation commonly referred to as stick slip, which may occur when the torque values fluctuate at a high frequency.

Figure 2C:
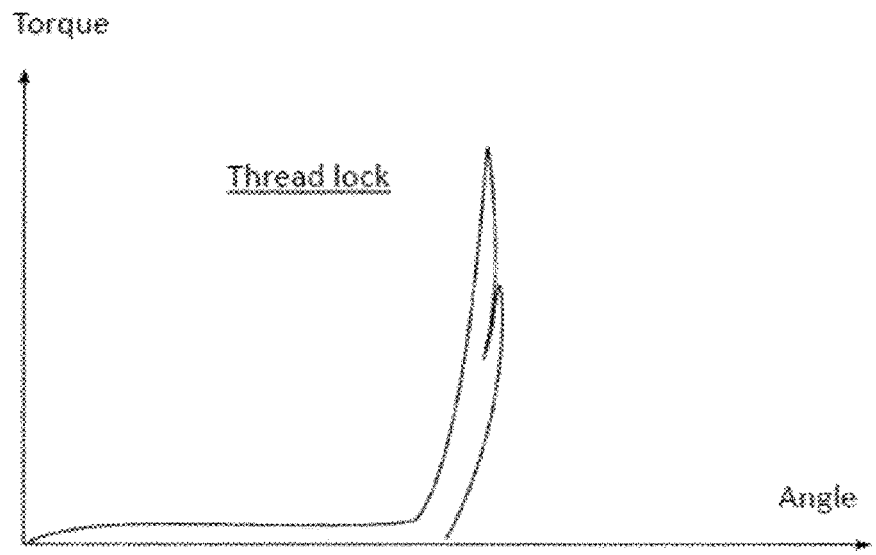

FIG. 2*c* illustrates another particular type of tightening operation; a so-called threadlock which may occur when the applied torque reaches a target torque immediately after a rundown phase. This is typically caused by the threads of the bolt 20 that istightened suddenly locking, for example because of the bolt 20 being entered into the thread at an angle or if the dimensions was not correct.

Figure 2D:
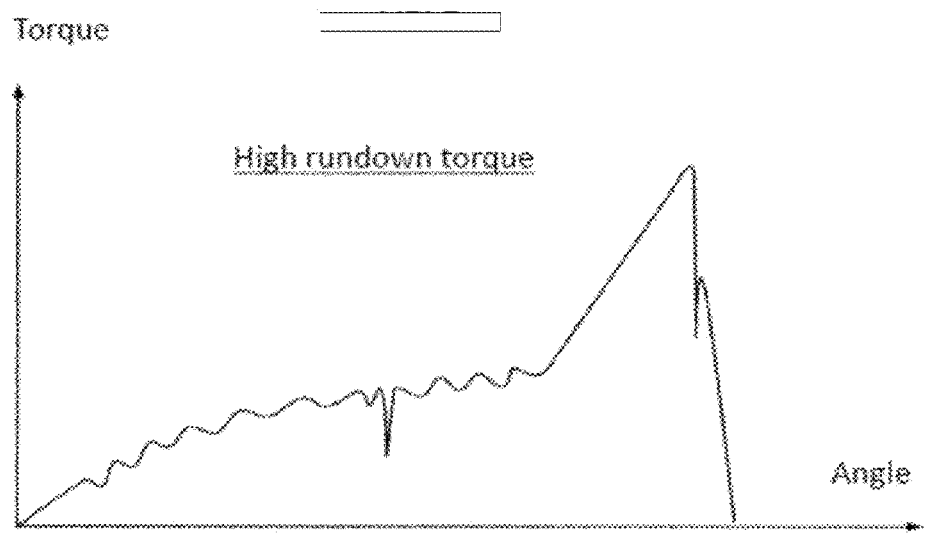

Finally, FIG. 2*d* illustrates a further particular type of tightening operation referred to as high rundown torque which may occur when the applied torque reaches a target torque during a rundown phase. This is typically caused by friction in the thread of the bolt 20 being higher than normal, for example because of the bolt 20 having an incorrect dimension, wrong thread coating or that the bolt 20 was slanted upon entering the thread.

As is understood, these are examples of incorrect tighten operations being performed by the tool 10, which preferably should be avoided. However, should they still occur, it is desirable that an operator or some supervision function is informed thereof.

Hence, in an embodiment, a trained machine-learning (ML) model is used to determine from acquired torque and angle values whether or not an incorrect tightening operation has been performed and if so, which particular type of tightening operation has been performed, i.e. whether it is one of the above-mentioned "disengage", "socket slip", "stick slip", "thread lock" and "high rundown torque" (or any other identified tightening operation).

Figure 3:
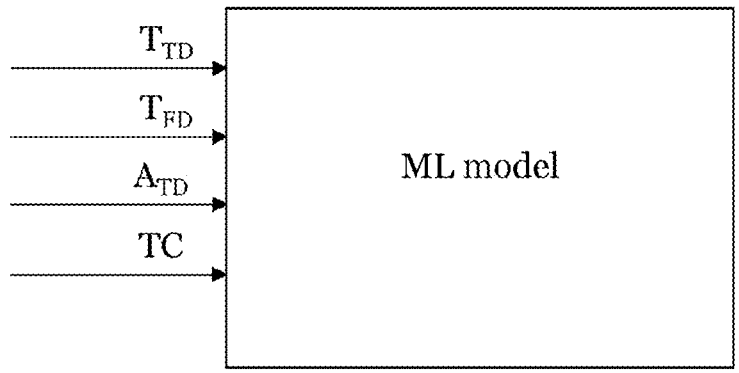
FIG. 3 illustrates training of a machine-learning model according to an embodiment.
Figure 4:
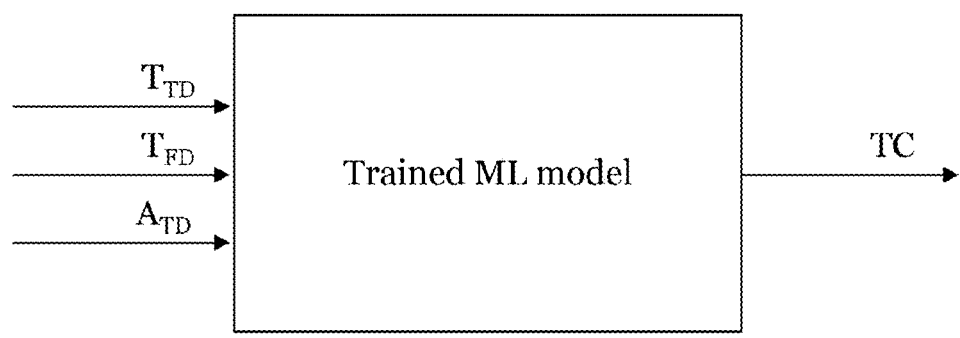
FIG. 4 illustrates utilizing the trained ML model in an embodiment.
Figure 5:
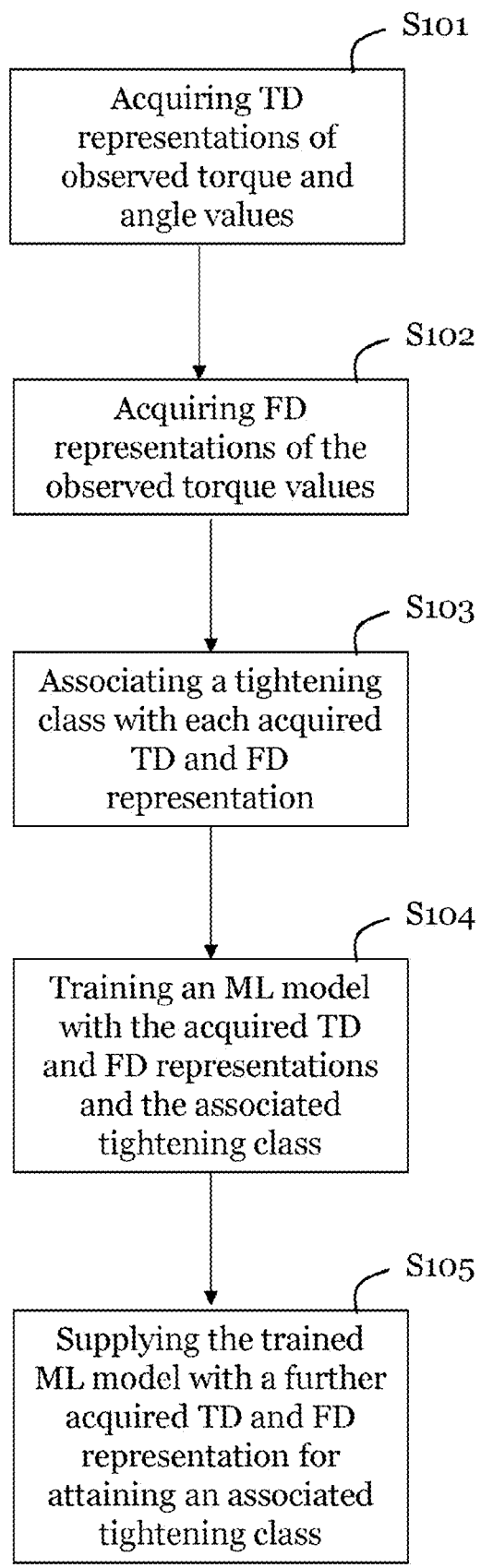
FIG. 5 shows a flowchart illustrating a method for determining a tightening class of a tightening operation performed by the tightening tool in an embodiment.

FIG. 3 illustrates the training of the ML model according to an embodiment, while FIG. 4 illustrates utilizing the trained ML model in an embodiment. Reference is further made to FIG. 5 showing a flowchart illustrating a method for determining a tightening class of a tightening operation performed by the tightening tool 10 according to an embodiment.

Thus, during a training phase, time-domain (TD) representations of sets of observed torque values $T_{TD}$ and angle values $A_{TD}$ for bolts 20 having been tightened by the tightening tool 10 is acquired in step S101. Thus, these are regular time-domain torque and angle values previously illustrated with reference to the graphs of FIGS. 2*a*-*d*.

For instance, each set may comprise, say, a hundred torque values and corresponding angle values acquired by the processing unit 16 from the torque sensor 19 and the angle sensor 22 upon the tightening tool 10 performing a tightening program.

Any acquired torque and angle values may be stored locally in the memory 18 and/or communicated wirelessly via the radio transmitter 15 to the remotely located cloud server 30.

Further, frequency-domain (FD) representations $T_{FD}$ of the sets of torque values for the fasteners having been tightened by the tightening tool 10 is acquired in step S102. Advantageously, the frequency domain representation $T_{FD}$ of the set of torque values facilitates observation of characteristics of the torque data which typically is not visible in the corresponding time-domain representation $T_{TD}$ of the set of torque values.

Figure 6A:
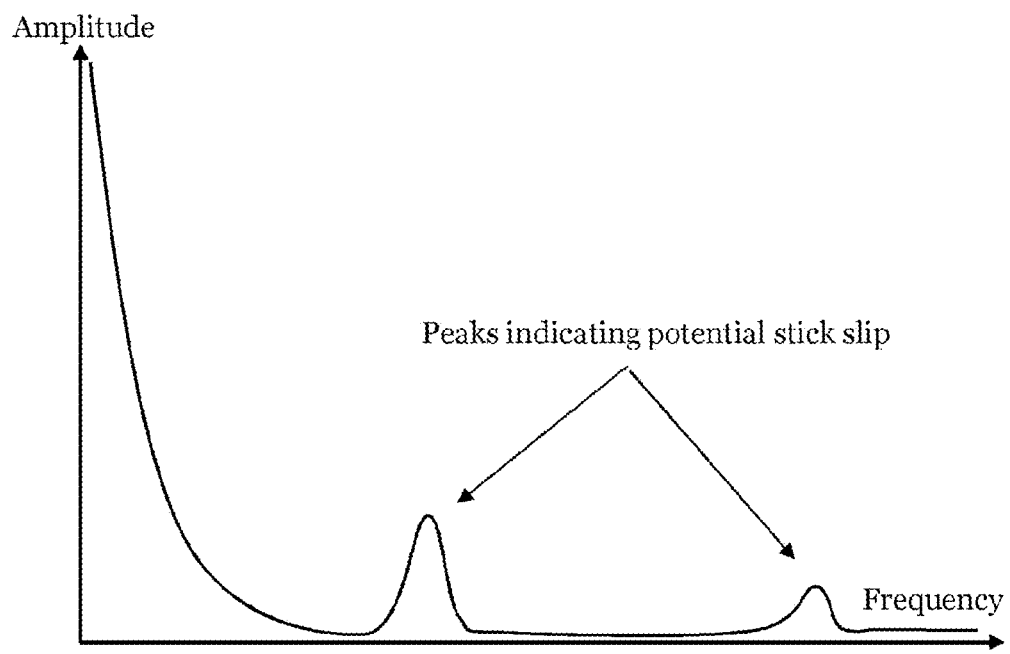
FIG. 6a illustrates a frequency-domain representation of torque during a stick slip tightening operation.
Figure 6B:
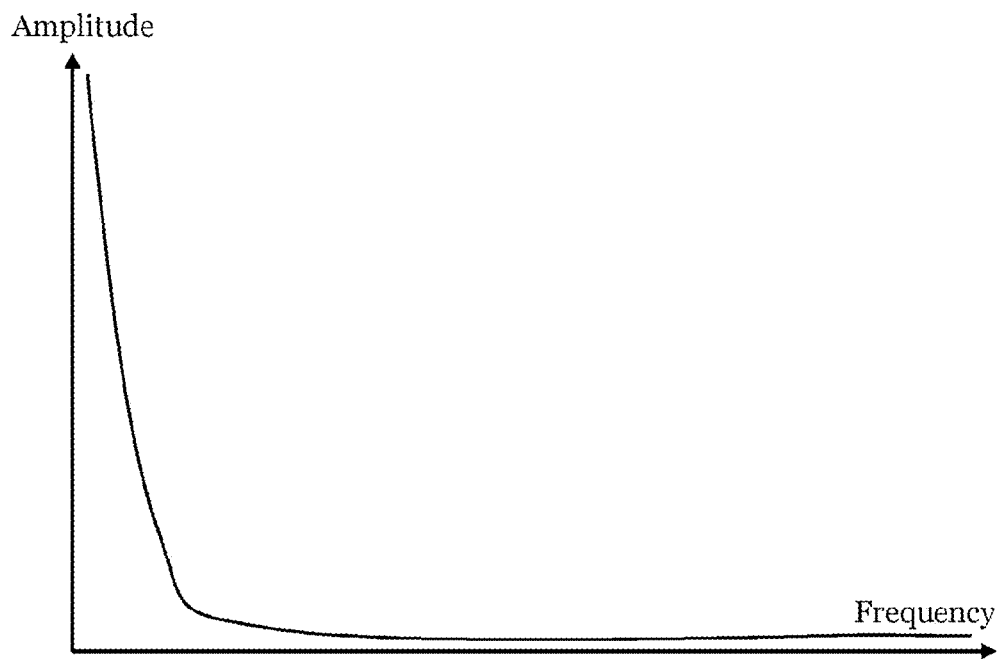
FIG. 6b illustrates a frequency-domain representation of torque during a normal tightening operation.

FIG. 6*a* illustrates a frequency-domain representation of torque during a stick slip tightening operation as indicated by two torque peaks, as compared to FIG. 6*b* illustrating a frequency-domain representation of torque during a normal tightening operation. A time-domain representation of stick slip was previously illustrated in FIG. 2*b*.

In step S103, a tightening class TC is associated with each set of acquired torque and angle values of steps S102 and S102. This tightening class thus identifies the type of tightening operation having been applied to the fasteners. As previously exemplified, the tightening class may include "disengage", "socket slip", stick slip", "thread lock" and "high rundown torque", etc., or any other identified tightening operation.

In an embodiment, the operator of the tool 10 identifies from the acquired sets of torque and angles values with which particular tightening class a set of measured values is to be associated. For instance, if the acquired time-domain representation of observed torque values $T_{TD}$ and angle values $A_{TD}$ have the appearance of FIG. 2*b* as presented to the operator via the display 14, the operator concludes that the associated tightening class should be "stick slip" and inputs information identifying the tightening class via the interface 23 to the tool 10.

Correspondingly, the operator may conclude that the acquired frequency-domain representation of torque values $T_{FD}$ have the appearance of FIG. 6*a*, which emphasises that the acquired sets of observed data indeed should be classified as "stick slip".

The identified tightening class is supplied to the ML model for training along with the acquired time-domain and frequency-domain representations in step S104.

This is typically repeated for a large number of time-domain representations of observed torque and angle values and the corresponding frequency-domain representations of the observed torque values, and the ML model will thus be effectively trained in step S104 to associate a tightening class with each supplied set of torque and angle values.

Thus, as shown in FIG. 4, upon a tightening program subsequently being performed by the tool 10, the trained ML model is supplied in step S105 with a further acquired time-domain representation ($T_{TD}$, $A_{TD}$) of a set of observed torque and angle values for the tightening program being performed, and a frequency-domain representation ($T_{FD}$) of the further set of observed torque values for a fastener having been tightened by tool 10 in step S105.

As a result, the trained ML model will advantageously output an estimated tightening class for the further supplied set of observed torque and angle values, for instance via the display 14 such that the operator can determined whether or not the tightening program is to be re-performed.

Additionally advantageous is that more information is available to the ML model by also considering the frequency-domain representation $T_{FD}$ of the sets of observed torque values, which provides for a more robust and accurate classification as compared to solely considering the time-domain representations of the sets of observed torque and angles values.

In embodiments, approaches utilized for training the ML model include neural networks, random forest-based classification, regression analysis, etc. An advantage of neural networks is their ability to learn to extract both temporal and spatial patterns from data sets.

Figure 7:
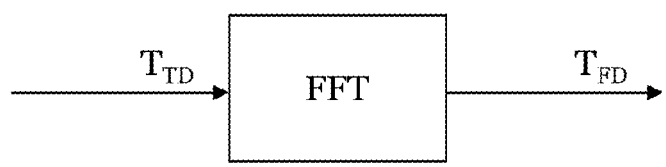
FIG. 7 illustrates a fast Fourier transform (FFT) being performed.

In an embodiment, as illustrated in FIG. 7, the frequency-domain representation of observed torque values is acquired by performing a so-called fast Fourier transform (FFT) on the acquired time-domain representation of the observed torque values, i.e. $T_{FD}=FFT(T_{TD})$.

The training of the ML model and the subsequent determining of tightening class for torque and angle values observed during a tightening program may be performed locally by the processing unit 16, or by the cloud server 30. The determined tightening class may be immediately communicated to the operator of the tool 10 via e.g. the display 14. As a consequence, the operator may unscrew the bolt 20 and perform a new tightening program in order to attain an adequate tightening.

In a further embodiment, in addition to acquiring frequency-domain representations of the observed sets of torque values for the fasteners having been tightened by the tightening tool 10 in step S102, frequency-domain representations $A_{FD}$ of the observed sets of angle values will further be acquired.

In accordance with the embodiment described hereinabove with reference to FIGS. 3-5, each frequency-domain representation $A_{FD}$ of the observed sets of angle values will further be associated with the tightening class in step S103 and the training of the ML model will thus further take into account the frequency-domain representations $A_{FD}$ of the observed sets of angle values in step S104. Finally, in step S105, a further acquired frequency-domain representation $A_{FD}$ of an observed set of angle values will be supplied to the trained ML model in order to have the trained ML model output an estimated tightening class.

Again, it is advantageous that more information is available to the ML model by also considering the frequency-domain representation $A_{FD}$ of the sets of observed angle values, which provides for a more robust and accurate classification as compared to solely considering the time-domain representations of the sets of observed torque and angles values.

In an embodiment, the frequency-domain representation of observed angle values is acquired by performing an FFT on the acquired time-domain representation of the observed angle values, i.e. $A_{FD}=FFT(A_{TD})$.

It is envisaged that the steps S101-S105 of the method according to embodiments may be performed by the control device 21 arranged in the tool 10 itself. However, it may also be envisaged that torque and angel values are measured by the torque sensor 19 and the angle sensor 22 and the communicated via transmitter 15 to the cloud server 30 being equipped with a corresponding control device for performing all steps S101-S105, which would relieve the processing unit 16 from the computational burden. The cloud server 30 may send information indicating the estimated tightening class to the tool 15 (i.e. the transmitter 15 may be a transceiver), which presents an alert of the tightening class to the operator via the display 14 or audibly via a small speaker included with the tool 10.

If may further be envisaged that the tool 10 performs all steps S101-S105 and then alerts the cloud server 30 of the estimated tightening class (possibly along with alerting the operator), which may hold a database of estimated tightening classes of numerous tools, or provides the alert e.g. to a supervision control room.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for determining a tightening class of a tightening operation performed by a tightening tool, the method comprising:
   acquiring time-domain representations of sets of observed torque and angle values for fasteners having been tightened by the tightening tool;
   acquiring frequency-domain representations of the observed sets of torque values for the fasteners having been tightened by the tightening tool;
   associating a tightening class with each acquired time-domain representation of the sets of observed torque and angle values and each acquired frequency-domain representation of the sets of observed torque values, the tightening class identifying a type of tightening operation having been applied to the fasteners;
   training a machine-learning model with the acquired time-domain representations of the sets of observed torque and angle values, the acquired frequency-domain representations of the sets of observed torque values and the tightening class associated with each set; and
   supplying the trained machine-learning model with a further acquired time-domain representation of a set of observed torque and angle values and a frequency-domain representation of the further set of observed torque values for a fastener having been tightened by the tightening tool, wherein the trained machine-learning model outputs an estimated tightening class for the supplied set of observed torque and angle values.

2. The method of claim 1,
   wherein the acquiring of frequency-domain representations of the observed sets of torque values for the fasteners having been tightened by the tightening tool further comprises:
   acquiring frequency-domain representations of the observed sets of angle values for the fasteners having been tightened,
   wherein the associating the tightening class further comprising:
   associating the tightening class with each acquired frequency-domain representation of the sets of observed angle values,
   wherein the training of the machine-learning model further comprising:
   training the machine-learning model with the acquired frequency-domain representations of the sets of observed angle values, and
   wherein the supplying further comprises:
   supplying the trained machine-learning model with a further acquired frequency-domain representation of the further set of observed angle values for a fastener having been tightened by the tightening tool.

3. The method of claim 1, wherein the frequency-domain representations of the observed torque values and the observed angle values is acquired by performing a fast Fourier transform on the acquired time-domain representations of the observed torque values and the observed angle values.

4. The method of claim 1, wherein the machine learning is based on one or more of: neural networks, random forest-based classification, and/or regression analysis.

5. The method of claim 1, wherein the tightening class is selected among a group of tightening operations having been applied to the fasteners indicating disengage, socket slip, stick slip, thread lock, and high rundown torque.

6. The method of claim 1, further comprising:
providing an alert of the estimated tightening class.

7. The method according to claim 6, wherein the alert is provided to one or more of: an operator of the tightening tool, to the tightening tool itself, to a supervision control room and/or to a remote cloud function.

8. The method according to claim 7, wherein the tightening tool provides an audible and/or visual alert to the operator of the tool.

9. A computer program product stored on a non-transitory computer-readable medium, said computer program product for determining a tightening class of a tightening operation performed by a tightening tool, wherein said computer program product comprising computer instructions to cause one or more control devices to perform the following operations:
   acquiring time-domain representations of sets of observed torque and angle values for fasteners having been tightened by the tightening tool;
   acquiring frequency-domain representations of the observed sets of torque values for the fasteners having been tightened by the tightening tool;
   associating a tightening class with each acquired time-domain representation of the sets of observed torque and angle values and each acquired frequency-domain representation of the sets of observed torque values, the tightening class identifying a type of tightening operation having been applied to the fasteners;
   training a machine-learning model with the acquired time-domain representations of the sets of observed torque and angle values, the acquired frequency-domain representations of the sets of observed torque values and the tightening class associated with each set; and
   supplying the trained machine-learning model with a further acquired time-domain representation of a set of observed torque and angle values and a frequency-domain representation of the further set of observed torque values for a fastener having been tightened by the tightening tool, wherein the trained machine-learning model outputs an estimated tightening class for the supplied set of observed torque and angle values.

10. A control device configured to determine a tightening class of a tightening operation performed by a tightening tool, the control device comprising a processing unit and a memory, said memory containing instructions executable by said processing unit, whereby the control device is operative to:
   acquire time-domain representations of sets of observed torque and angle values for fasteners having been tightened by the tightening tool;
   acquire frequency-domain representations of the observed sets of torque values for the fasteners having been tightened by the tightening tool;
   associate a tightening class with each acquired time-domain representation of the sets of observed torque and angle values and each acquired frequency-domain representation of the sets of observed torque values, the tightening class identifying a type of tightening operation having been applied to the fasteners;
   train a machine-learning model with the acquired time-domain representations of the sets of observed torque and angle values, the acquired frequency-domain representations of the sets of observed torque values and the tightening class associated with each set; and
   supply the trained machine-learning model with a further acquired time-domain representation of a set of observed torque and angle values and a frequency-domain representation of the further set of observed torque values for a fastener having been tightened by the tightening tool, wherein the trained machine-learning model outputs an estimated tightening class for the supplied set of observed torque and angle values.

11. The control device of claim 10, wherein the control device is arranged inside or in connection to the tool, or being a control device located remotely from, and in communication with, the tightening tool.

12. The control device of claim 10, further being operative to acquire the sets of observed torque values from a torque measurement sensor of the tightening tool and the sets of observed angles values from an angle measurement sensor of the tightening tool.

13. The control device of claim 10, further comprising a communication interface via which data may be transmitted and/or received via wire or by wireless communication.

14. A tightening tool comprising a control device configured to determine a tightening class of a tightening operation performed by a tightening tool, the control device comprising a processing unit and a memory, said memory containing instructions executable by said processing unit, whereby the control device is operative to:
   acquire time-domain representations of sets of observed torque and angle values for fasteners having been tightened by the tightening tool;
   acquire frequency-domain representations of the observed sets of torque values for the fasteners having been tightened by the tightening tool;
   associate a tightening class with each acquired time-domain representation of the sets of observed torque and angle values and each acquired frequency-domain representation of the sets of observed torque values, the tightening class identifying a type of tightening operation having been applied to the fasteners;
   train a machine-learning model with the acquired time-domain representations of the sets of observed torque and angle values, the acquired frequency-domain representations of the sets of observed torque values and the tightening class associated with each set; and
   supply the trained machine-learning model with a further acquired time-domain representation of a set of observed torque and angle values and a frequency-domain representation of the further set of observed torque values for a fastener having been tightened by the tightening tool, wherein the trained machine-learning model outputs an estimated tightening class for the supplied set of observed torque and angle values.

* * * * *